US008649558B2

(12) United States Patent
Gleicher et al.

(10) Patent No.: US 8,649,558 B2
(45) Date of Patent: Feb. 11, 2014

(54) VIDEO PROCESSING WITH REGION-BASED WARPING

(75) Inventors: Michael Gleicher, Madison, WI (US); Feng Liu, Portland, OR (US); Yuzhen Niu, Shandong (CN)

(73) Assignee: Wisconsin Alumni Research Foundation, Madison, WI (US)

( * ) Notice: Subject to any disclaimer, the term of this patent is extended or adjusted under 35 U.S.C. 154(b) by 247 days.

(21) Appl. No.: 13/149,609

(22) Filed: May 31, 2011

(65) Prior Publication Data

US 2012/0307155 A1    Dec. 6, 2012

(51) Int. Cl.
*G06K 9/00* (2006.01)

(52) U.S. Cl.
USPC .......................................................... 382/103

(58) Field of Classification Search
USPC .......................................................... 382/103
See application file for complete search history.

(56) References Cited

U.S. PATENT DOCUMENTS

2007/0263900 A1* 11/2007 Medasani et al. ............. 382/103
2009/0010512 A1*  1/2009 Zhu et al. ...................... 382/130

OTHER PUBLICATIONS

B. D. Lucas and T. Kanade. An iterative image registration technique with an application to stereo vision. In *IJCAI '81:Proceedings of International Joint Conference on Artificial Intelligence*, pp. 674-679, 1981.
P. S. Heckbert. Fundamentals of texture mapping and image warping. Technical Report UCB/CSD-89-516, EECS Department, University of California, Berkeley, Jun. 1989.
H. Yee, S. Pattanaik, and D. P. Greenberg. Spatiotemporal sensitivity and visual attention for efficient rendering of dynamic environments. *ACM Trans. Graph.*, 20(1):39-65, 2001.
J. W. Davis and A. F. Bobick. The recognition of human movement using temporal templates. *IEEE Transactions on Pattern Analysis and Machine Intelligence*, 23(3):257-267, 2001.
L.-Q. Chen, X. Xie, X. Fan, W.-Y.Ma, H.-J. Zhang, and H.-Q. Zhou. A visual attention model for adapting images on small displays. *Multimedia Systems*, 9(4):353-364, 2003.
Z. Rasheed and M. Shah. Scene detection in Hollywood movies and tv shows. In *CVPR '03: Proceedings of the IEEE Computer Society Conference on Computer Vision and Pattern Recognition*, pp. 343-348, 2003.
B. Suh, H. Ling, B. B. Bederson, and D. W. Jacobs. Automatic thumbnail cropping and its effectiveness. In *UIST '03: Proceedings of the 16th annual ACM symposium on User Interface Software and Technology*, pp. 95-104, 2003.
E. P. Bennett and L. McMillan. Video enhancement using per-pixel virtual exposures. *ACM Trans. Graph.*, 24(3):845-852, 2005.

(Continued)

*Primary Examiner* — Alex Liew
(74) *Attorney, Agent, or Firm* — Crawford Maunu PLLC

(57) ABSTRACT

Video data is processed with region-based warping. In accordance with various example embodiments, video data having a plurality of source video frames is processed as follows, for each source video frame. Pixels representing the source video frame and at least one temporally-adjacent video frame are used to generate a motion history map, based upon frame-to-frame movement of at least one region in the source video frame and temporally-adjacent video frames. At least one salient region is identified in the source video frame based upon the motion history map and static image saliency data. Weighting data is determined for warping pixels corresponding to background regions of the source video frame differently than pixels corresponding to the at least one salient region in the source video frame. Using the weighting data, the pixels representing the source video frame are warped to generate pixels representing a warped video frame.

25 Claims, 4 Drawing Sheets

(56) References Cited

OTHER PUBLICATIONS

T. Igarashi, T. Moscovich, and J. F. Hughes. As-rigidas—possible shape manipulation. *ACM Trans. Graph.*, 24(3):1134-1141, 2005.

R. Gal, O. Sorkine, and D. Cohen-Or. Feature-aware texturing. In *EGSR '06: Proceedings of the 17th Eurographics Symposium on Rendering*, pp. 297-303, 2006.

F. Liu and M. Gleicher. Region enhanced scale-invariant saliency detection. In *ICME '06: Proceedings of IEEE International Conference on Multimedia and Expo*, pp. 1477-1480, 2006.

F. Liu and M. Gleicher. Video retargeting: automating pan and scan. In *Multimedia '06: Proceedings of the 14th international conference on Multimedia*, pp. 241-250, 2006.

R. Szeliski. Image alignment and stitching: a tutorial. *Found. Trends. Comput. Graph. Vis.*, 2(1):1-104, 2006.

S. Avidan and A. Shamir. Seam carving for content-aware image resizing. *ACM Trans. Graph.*, 26(3):267-276, 2007.

R. Fattal. Image upsampling via imposed edge statistics. *ACM Trans. Graph.*, 26(3):95, 2007.

L. Wolf, M. Guttmann, and D. Cohen-Or. Non-homogeneous content-driven video-retargeting. In *ICCV '07: Proceedings of the Eleventh IEEE International Conference on Computer Vision*, pp. 1-6, 2007.

T. Deselaers, P. Dreuw, and H. Ney. Pan, zoom, scan timecoherent, trained automatic video cropping. In *CVPR '08: Proceedings of the IEEE Computer Society Conference on Computer Vision and Pattern Recognition*, pp. 1-8, 2008.

M. Rubinstein, A. Shamir, and S. Avidan. Improved seam carving for video retargeting. *ACM Trans. Graph.*, 27(3):1-9, 2008. 9,08.

Y.-S. Wang, C.-L. Tai, O. Sorkine, and T.-Y. Lee. Optimized scale-and-stretch for image resizing. *ACM Trans. Graph.*, 27(5), 2008.

F. Liu, M. Gleicher, H. Jin, and A. Agarwala. Contentpreserving warps for 3D video stabilization. In *SIGGRAPH '09: ACM SIGGRAPH 2009 papers*, pp. 1-9, 2009.

M. Rubinstein, A. Shamir, and S. Avidan. Multi-operator media retargeting. *ACM Trans. Graph.*, 28(3):1-11, 2009.

Y.-S. Wang, H. Fu, O. Sorkine, T.-Y. Lee, and H.-P. Seidel. Motion-aware temporal coherence for video resizing. *ACM Trans. Graph.*, 28(5), 2009.

G.-X. Zhang, M.-M. Cheng, S.-M. Hu, and R. R. Martin. A shape-preserving approach to image resizing. *Computer Graphics Forum*, 28(7):1897-1906, 2009.

J.-S. Kim, J.-H. Kim, and C.-S. Kim. Adaptive image and video retargeting based on fourier analysis. In *CVPR '09: Proceedings of the IEEE Computer Society Conference on Computer Vision and Pattern Recognition*, pp. 1730-1737, 2009.

P. Krahenbuhl, M. Lang, A. Hornung, and M. Gross. A system for retargeting of streaming video. *ACM Trans. Graph.*, 28(5):1-10, 2009.

\* cited by examiner

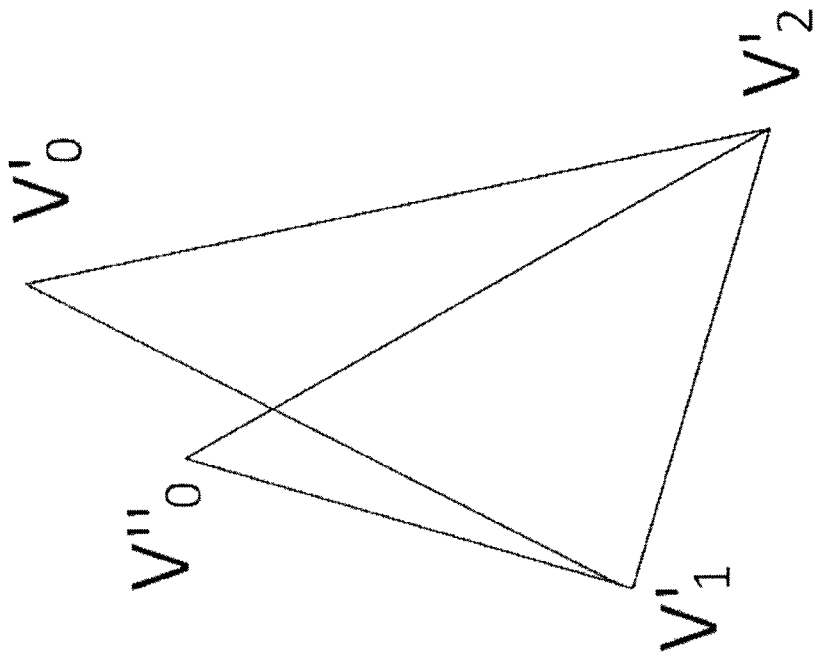
FIG. 2B
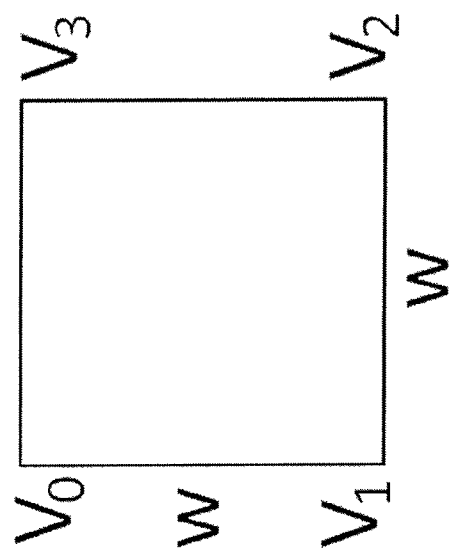
FIG. 2A
FIG. 2

VIDEO PROCESSING WITH REGION-BASED WARPING

FEDERALLY SPONSORED RESEARCH OR DEVELOPMENT

This invention was made with government support under 0416284 awarded by the National Science Foundation. The government has certain rights in the invention.

FIELD

Aspects of the present invention relate generally to processing image data, and more specifically, to devices, systems and methods for warping video.

BACKGROUND

Image and video resizing involves adapting an image or video to displays with different sizes and aspect ratios relative to the original image/video size, resulting in warping or distortion. Recently, a significant amount of effort has been devoted to this problem. Video retargeting addresses the problem of adapting a video for display at different size and aspect ratios than originally intended.

While various video and image processing approaches have experienced some success, images generated have often included undesirable characteristics. For example, many images generated using previous approaches sacrifice temporal coherence, resulting in jitter, or require expensive space-time optimization. One such approach involves seam carving, which changes image sizes by removing or inserting seams in regions that are least noticeable, to retain as much information as possible while avoiding objectionable distortion. Another approach involves a spatially varying warp application in which distortion is distributed to regions that are less salient to the human visual system than the others. While some resizing approaches such as content-aware approaches, seam carving-based methods and spatially varying warp-based methods can be useful for image resizing, their extension to video has been challenging. Moreover, various processes used to generate such images require significant computational resources and are often unsuccessful for videos with significant camera and object motion. Many approaches that address camera and object motion involve intense computation.

These and other problems have been challenging to a variety of methods, devices and systems that use or benefit from video resizing.

SUMMARY

Various aspects of the present invention are directed to devices, methods and systems involving video resizing that address challenges including those discussed above.

In accordance with an example embodiment, video data is processed as follows for each of a plurality of source video frames, to warp (e.g., resize) the video data for display. Resizing, in various contexts, involves displaying an original-sized video at a different size, or displaying an original-sized video at a consistent or scaled size with emphasis on salient regions in the video (e.g., to render salient regions easier/more pleasant to see and/or follow). Pixels representing the source video frame and at least one temporally-adjacent video frame are used to generate a motion history map based upon frame-to-frame movement of at least one region in the source video frame and temporally-adjacent video frames. At least one salient region (e.g., a set of pixels that are salient) is identified in the source video frame based upon the motion history map and static image saliency data. Weighting data is determined for warping pixels corresponding to background regions of the source video frame differently than pixels corresponding to the identified at least one salient region in the source video frame, and the pixels representing the source video frame are warped using the weighting data to generate pixels representing a warped video frame.

Another example embodiment is directed to a method for processing a stream of video data. In response to a user input setting a tradeoff condition between temporal coherence and shape preservation, a number of temporally-adjacent video frames is set for use in determining frame-to-frame movement of at least one region in the temporally-adjacent video frames. For each of a plurality of video frames in the stream of video data, at least one region of the frame is determined as a salient region based upon frame-to-frame movement of an object in the set number of video frames that are temporally adjacent the video frame, and upon image saliency data that identifies image-salient regions in the video frame. For each of the plurality of video frames, background regions of the image are weighted differently from the at least one region of the frame determined as salient.

Another example embodiment is directed to an article of manufacture including a processor-readable storage medium configured with configuration data that when executed by a processor, cause the processor to, for each of a plurality of source video frames, carry out the following steps. A motion history map is generated based upon frame-to-frame movement of at least one region in the source video frame and temporally-adjacent video frames using pixels representing the source video frame and at least one temporally-adjacent video frame. At least one salient region is identified in the source video frame based upon the motion history map and static image saliency data. Weighting data is determined for warping pixels corresponding to background regions of the source video frame differently than pixels corresponding to the at least one salient region in the source video frame. Using the weighting data, the pixels representing the source video frame are warped to generate pixels representing a warped video frame.

Another example embodiment is directed to a system for processing video data, including a logic circuit configured to carry out the following steps for each of a plurality of source video frames. A motion history map is generated based upon frame-to-frame movement of at least one region in the source video frame and temporally-adjacent video frames using pixels representing the source video frame and at least one temporally-adjacent video frame. At least one salient region is identified in the source video frame based upon the motion history map and static image saliency data. Weighting data is determined for warping pixels corresponding to background regions of the source video frame differently than pixels corresponding to the at least one salient region in the source video frame. Using the weighting data, the pixels representing the source video frame are warped to generate pixels representing a warped video frame.

The above summary is not intended to describe each embodiment or every implementation of the present invention. The figures and detailed description that follow more particularly exemplify various embodiments.

DESCRIPTION OF THE FIGURES

Aspects of the invention may be more completely understood in consideration of the following detailed description of various embodiments in connection with the accompanying drawings, in which:

FIG. 2 shows plots for shape distortion measurement, in which FIG. 2A represents an input square mesh patch and FIG. 2B represents corresponding target vertices, in accordance with another example embodiment of the present invention;

Figure 1:
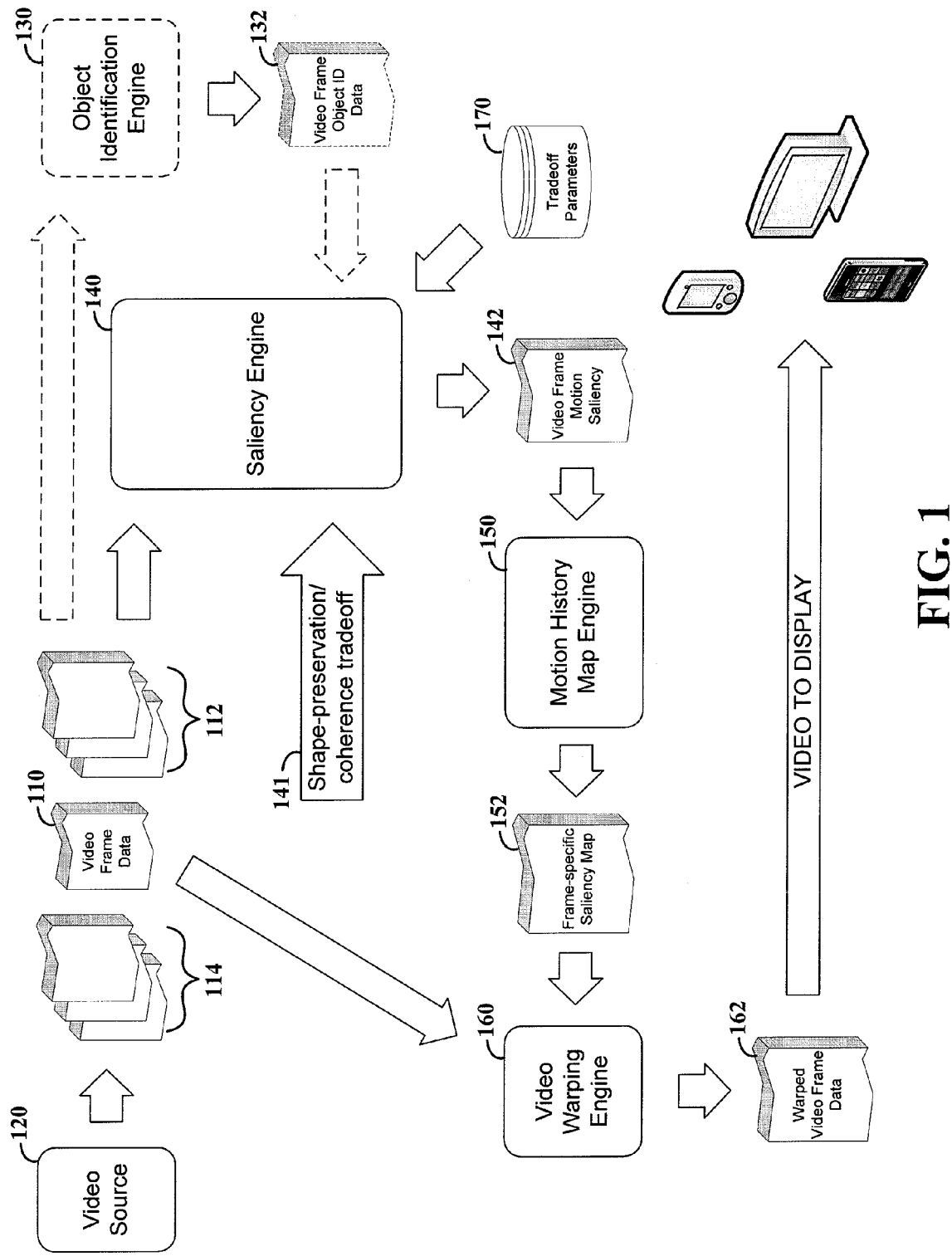
FIG. 1 shows a data flow diagram for warping video, in accordance with an example embodiment of the present invention.

While various embodiments of the invention are amenable to modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

Various aspects of the present invention are directed to video retargeting approaches that address problems including those relating to adapting video for display at a different size and/or aspect ratio than the video data is configured or otherwise intended for. Images in video data are retargeted (e.g., resized in part or in whole) to efficiently process video data while maintaining certain temporal coherence and mitigate geometric distortion. In various aspects, loss of temporal coherence (resulting in jitter), or expensive space-time optimization can be avoided. While the present invention is not necessarily limited to such approaches, various aspects of the invention may be appreciated through a discussion of various examples using this context.

In the context of various embodiments, reference is made to terms such as video, images, video frames, objects and others relative to images presented in the form of a video display. In these embodiments, reference to these terms is generally applicable to data that represents the terms. For example, reference to warping an image is akin to processing initial image data representing the image to generate processed data that can be used to generate video in which the image is warped, relative to video generated using the initial image data. In these contexts, various functions as performed using these terms relate to the generation of or transformation of data representing an image corresponding to the term. In addition, a corresponding warped video frame may be tailored to suit a size of a particular display, with the size and shape of salient regions preserved, relative to more heavily warped background regions (e.g., images of a person or vehicle may be preserved relative to background regions such as those including buildings and a surrounding environment).

In accordance with various example embodiments, each frame and/or specific regions of each frame in a set of video frames are warped independently, while also mitigating and/or avoiding the introduction of jitter, to produce a warped video frame for display at a retargeted display size, or at an unchanged display size with emphasis on salient aspects in the video. Such regions may correspond to one or more pixels in the region and represent a portion of the frame, with each region being warped relative to the rest of the frame and/or other regions. In this context, the terms "region" or "region-based" in processing/warping refer to groups of pixels which may or may not be contiguous or have a particular shape. Background regions are distorted similarly relative to prior frames while avoiding distortion in areas of the frame corresponding to salient regions, as may correspond to important features and/or moving objects.

A motion history map is used to propagate information about the regions involving motion (or data corresponding thereto) between frames, and is used to achieve graceful tradeoffs between temporal coherence in the background regions and shape preservation for the regions involving motion. In various implementations, salient regions including motion-salient regions tracked via a motion history map are kept relatively undistorted while avoiding a time-varying warp in background areas of the image, by weighting an applied warp relative to the salient regions and background. Weighting, in this context, can be applied to preserve the shape of objects (e.g., in salient regions), relative to a tradeoff as discussed above for achieving frame-to-frame coherence (e.g., to mitigate jitter). These approaches can be implemented with video frames corresponding to scenes having significant camera and object motion, to avoid jitter and efficiently warp each frame sequentially, for high-quality video retargeting and display (e.g., for resizing video for use with small or differently-sized displays). Moreover, various embodiments are directed to warp propagation using a motion history map for a relatively small number of video frames (e.g., less than three seconds worth, or less than about 10 frames).

In many implementations, regions of an image that are considered background or foreground may blend, in which pixels may have characteristics of both foreground and background regions of an image. Such pixels can be characterized as foreground or background depending upon a degree of relevance of the pixels to foreground or background. Accordingly, this characterization can be made in a non-binary manner, to characterize pixels (or regions of pixels) as corresponding to both foreground and background regions.

In a more particular embodiment, video frames are warped sequentially by propagating a spatially-varying warp from frame-to-frame (e.g., from a current frame to a next frame for each frame in a sequence of two or more frames), by estimating and using a motion history map at each frame to control (e.g., weight) the application of a warp to areas within each frame. The motion history map is estimated by recording scene motion information at neighboring frames, and this scene motion information is used to coordinate the propagation of warps between multiple frames. Each frame is encouraged (e.g., data-warping transformation therein is appropriately controlled) to undergo the same or similar warp as applied to a previous (and/or next) frame in a sequence to mitigate or avoid jitter. This frame-to-frame warp control constraint (e.g., a weighting factor) is relaxed in regions identified via the motion history map as corresponding to salient regions, to avoid distortion of the object(s) corresponding to the salient regions and exhibit robust resistance to motion estimation errors.

In various contexts, salient regions include portions of an image that move from frame to frame, and other portions of an image that may or may not move, and are designated as important with respect to other background portions of an image (e.g., a portion of a video that draws a viewer's attention). In these contexts, the term "move" applies to one or both of an object that is moving between frames, or a region of a video frame that changes (e.g., an object not present in a previous frame becomes visible in a current frame, or a visible object disappears). Accordingly, salient regions include one or both of motion-salient regions that are determined to be salient based upon the movement of a portion of the image therein, and image-salient regions determined to be salient based upon an importance of the region. Such image-salient regions may include, for example, an actor or actors in a scene, and may be defined in one or more of a variety of manners.

In various implementations, an amount of warp as applied to each of one or more regions corresponding to salient regions and background regions is set based upon a tradeoff between temporal coherence and desired warp of the object. Moreover, various embodiments are directed to implementing such approaches without necessarily solving spatio-temporal optimization problems, limiting computational resources. Warping frames based upon a limited number of adjacent video frames also limits computational resources, which can facilitate warping under a variety of conditions such as with streaming video.

According to a more particular example embodiment, video frames are sequentially warped using information regarding regions in multiple frames in a series of frames (e.g., a subset of an entire set of video frames) to generate a motion saliency map for guiding the warp for each frame. Each frame is warped in a manner that prevents distortion for certain corresponding regions in the frame (e.g., regions having motion or image saliency), to achieve both temporal coherence and shape preservation.

The number of video frames from which motion information is combined for generating a motion saliency map is adjusted to achieve a trade-off between shape preservation for a particular region (e.g., and objects therein) and temporal coherence in the background. Generally, a relatively large frame window is used to achieve desirable temporal coherence for the background, at the expense of distortion for the salient region(s). Using this approach, salient regions are distorted in a generally consistent manner over time. A relatively small window is used to achieve desirable shape preservation for salient regions, at the expense of temporal coherence for the background. Using this approach, the incoherence is generally limited to portions of the image outside of the combined motion areas and otherwise salient areas, which is less objectionable to the eye.

In connection with these embodiments, it has been discovered that the size of the window (and corresponding number of frames) can be set to achieve a tradeoff between these approaches, to respectively emphasize either background temporal coherence or shape preservation for objects that move from frame to frame. It has further been discovered that temporal coherence and shape preservation can be achieved with set numbers of video frames of less than about 20, less than about 10 and less than about 5 video frames, to suit particular applications. The amount of tradeoff, and corresponding frame size, can thus be set to suit particular applications.

Frames are warped using one or more of a variety of methods, by applying the warp to salient and background regions differently (e.g., by differently weighting the application of the warp to different regions, such as by effecting a stiffness to particular regions to control the warp therein). For a sequence of video frames, the first frame is warped using a spatially-varying grid mesh warp-based method, and the warp is propagated to one or more subsequent frames. A variety of spatially varying warp-based video resizing methods can be applied, which may involve one or more aspects of warping approaches as described in the following references: P. Krähenbühl, M. Lang, A. Hornung, and M. Gross, "A system for retargeting of streaming video," *ACM Trans. Graph.*, 28(5):1-10, (2009); Y.-S. Wang, H. Fu, O. Sorkine, T.-Y. Lee, and H.-P. Seidel, "Motion-aware temporal coherence for video resizing," *ACM Trans. Graph.*, 28(5) (2009); and L. Wolf, M. Guttmann, and D. Cohen-Or, "Non-homogeneous content-driven video-retargeting," in *ICCV '07: Proceedings of the Eleventh IEEE International Conference on Computer Vision*, pages 1-6 (2007). Each of these documents is fully incorporated herein by reference.

Scene motion from neighboring frames is blended into a motion history map for the frames. One or more regions for which shape preservation is important are tracked as the region(s) move throughout neighboring frames. In one example in which a motion history map is determined for a particular frame, frame-to-frame region movement is determined for a set of adjacent frames, moving forward and/or backward in time. For a particular frame, the movement of the region in adjacent frames is imparted to the particular frame to determine a motion history map pertaining to adjacent frames. This history map may, for example, include frames in the "future" from a time perspective (thus the term "history" may be accordingly applied to previous and future frames), such that the map identifies a portion of a current frame in which the region moves in the adjacent frames, thus identifying an area in the frame that is motion-salient. The movement of a region from frame to frame may also be projected to different locations on the motion history map to correct for global and/or camera motion. Such global/camera motion correction may be carried out prior to warping or other processing, as described in various embodiments herein. Using such motion history insight from an adjacent frame or frames, a warp is propagated from a previous frame in a manner that mitigates or avoids jitter, and provides control over foreground/background coherence tradeoffs.

Image saliency and motion saliency are combined into a saliency map to guide warping, so that visually salient content is not distorted as much as less salient content. In some implementations, the scale-invariant image saliency is calculated using an approach such as that described by F. Liu and M. Gleicher, "Region Enhanced Scale-invariant Saliency Detection," *ICME '06: Proceedings of IEEE International Conference on Multimedia and Expo*, pages 1477-1480 (2006), which is fully incorporated by reference. The motion saliency is calculated as the difference between the local optical flow and the global background motion. Optical flow is calculated in each frame using, for example, the Lucas and Kanade method to calculate optical flow in each frame (see, e.g., B. D. Lucas and T. Kanade, "An Iterative Image Registration Technique with an Application to Stereo Vision," *IJCAI '81: Proceedings of International Joint Conference on Artificial Intelligence*, pages 674-679 (1981), also incorporated herein by reference). In some implementations, background motion is modeled using a homography, and the homography is estimated using a SIFT-feature based method. One approach for calculating a homography as may be used in connection with one or more embodiments is described in R. Szeliski, "Image Alignment and Stitching: A Tutorial," *Found Trends. Comput. Graph. Vis.*, 2(1):1-104, (2006), also incorporated herein by reference.

The various embodiments as discussed herein are applicable for use with a variety of types of video, presented using a variety of mediums. In some implementations, video frames streamed over a network such as the Internet are processed via warping as described herein, to resize the video frames. The video can be warped as the stream is received, using a relatively small set of frames (e.g., without needing a significant portion or all of the video). The warped frames can be stored for later display, such as by storing the frames on a web server or at a link in a mobile telecommunication network, for use on mobile devices such as mobile telephones, media devices or computers. In some implementations, the warping is effected by an entity system on a network such as the Internet, which serves subscribers such as users and/or content providers, with the system functioning between a video source and an end-user display device. In these contexts, the video processing/transformation and related operations can be carried out on a front-end or back-end system, relative to a video source and video display device.

Various example embodiments are also directed to one or more approaches and/or systems as described in Niu, et al., "Warp Propagation for Video Resizing," IEEE CVPR 2010, San Francisco (June 2010), and/or as described in connection with the various references cited therein. This document and the references cited therein are fully incorporated herein by reference.

Turning now to the figures, FIG. 1 shows a data-flow diagram for the warping of a series of video frames for display in a re-sized format, according to another example embodiment. While the following discussion addresses the warping of a source video frame 110 (frame data corresponding to a source video frame), this discussion is applicable to warping several such frames and/or all such frames in a video. Accordingly, the warping approaches can be carried out on a frame-by-frame basis (e.g., each video frame can be warped independently, using neighborhood frames). A subset of video frames including a source video frame 110, and a series of frames temporally before (112) and after (114) the source video frames are received from a video source 120. The video source may be a local source such as a video playback device accessing stored video, or a remote source that streams video frames for display. Accordingly, various embodiments are directed to processing video frames from a variety of different types of video, received from different sources, using a small series of a few or several video frames.

The saliency engine 140 generates saliency map data 142 for each of a plurality of video frames temporally adjacent the source video frame 110, representing salient regions in each video frame including motion-salient regions that are subject to frame-to-frame movement. In many implementations, the saliency engine generates the saliency map data 142 corresponding to a relatively large number of video frames (e.g., 80 frames), with the number of frames being adjusted relative to a tradeoff between shape preservation and temporal coherence (and computational requirements, where appropriate).

A motion history map generation engine 150 uses the saliency map data 142 to generate frame-specific saliency history map data 152 for the source video frame 110. The saliency history map data 152 includes positional data for the motion-salient regions identified via the saliency map data 142, for frames temporally adjacent the source video frame 110. This motion history map is based upon the source video frame 110 and a relatively limited number of temporally adjacent video frames (e.g., 2 or three frames before and after the source video frame), with a smaller number of frames serving to preserve temporal coherence.

In some implementations, the saliency engine 140 also identifies image-salient regions as discussed above, for each video frame. The saliency map data 142 may thus also include image-salient regions, and shows a combined image-salient and motion-salient map for the source video frame and temporally adjacent video frames.

A video warping engine 160 warps the source video frame 110 using the saliency history map data 152 specific to the source video frame 110 to generate a weighting factor or factors used to weight the application of the warp differently for regions of the source video frame, respectively corresponding to salient portions and other (background) portions of the frame, as corresponding to the saliency map data 142. The video warping engine 160 outputs warped video frame data 162 that is provided for output to a display, such as a re-sized display, with hand-held devices and a flat-panel display (e.g., for a computer or television) shown by way of example. In some implementations, the video warping engine 160 uses the saliency map data 142 directly, and the motion history map generation engine 150 reports motion between the aforesaid limited number of temporally adjacent frames independently from the motion saliency data.

In many embodiments, the video warping engine 160 uses a warping function and related constraints or settings from one of the temporally previous video frames 112, and modifies the warping function based upon the weighting factor/factors generated using the saliency map data 152. The resulting warped video frame data 162 includes image data, such as pixels, that are transformed relative to the source video frame 110, and that correspondingly represent a transformed (warped) image for display. A multitude of video frames can be warped in this manner, on a frame-by-frame basis, using information from a relatively limited number (e.g., a second or two) of temporally adjacent video frames.

The tradeoff between shape preservation and temporal coherence as implemented at the saliency engine 140 may, for example, be gleaned from data (e.g., a lookup table for a particular type of video or intended use) as stored in and retrieved from a data storage system 170, or obtained via user input (represented by arrow 141). Where user input is obtained, this can be effected via an input device integrated with or connected to a device upon which warped data is to be displayed, such as via a keypad, touch screen, knob (virtual or physical), or other input device. This tradeoff may be implemented, for example, by setting a number of frames (window) from which to obtain and define one or both of motion-saliency and image saliency for determining a saliency map for the source video frame 110. In some implementations, a different number of frames are used in determining image saliency, relative to a number of frames used for determining motion saliency. Where the tradeoff is user-defined, certain embodiments are directed to interactively obtaining user input for tuning, or setting, an emphasis on shape preservation as relative to temporal coherence and related tradeoffs therebetween. In some implementations, a user input device is used with imagery feedback to the user to facilitate the user's ability to visually tune the image as relative to the tradeoff between shape preservation and temporal coherence (and mitigation of jitter, such as discussed above).

The above tradeoff-based approach may also be implemented in connection with other approaches to resizing video, such as seam carving, cropping of a portion of an image, or a combination of these approaches with and/or without warping as discussed herein. Accordingly, various aspects are directed to such approaches including those described in the background and also in one or more of the various references cited herein.

Where the source video frame is a first frame of a video, an initial warp function can be determined, using the identified object or objects and one or more of a variety of approaches for warping video frames. For example, a warp function can be set to achieve selective (more aggressive/highly-weighted) warping of background features as relative to objects in the scene, to facilitate desirable shape preservation.

The source video frame 110 is optionally processed at an object identification engine 130 that is configured to identify an object or objects in each frame for tracking and potential shape preservation, relative to other background portions of the frame. The object identification engine 130 generates and outputs video frame object identification data 132, for use at the saliency engine 140. This output includes data usable to identify portions of a video frame, and/or of a subset of adjacent video frames, that correspond to a tracked object and/or to an object of interest (e.g., for image saliency). Generally, the identified object or objects are those for which the shape thereof is desirably preserved to facilitate an enjoyable or otherwise acceptable viewing experience, and may often involve those shapes that move from frame to frame. Object identification may involve one or more of a variety of approaches, such as those described herein. Furthermore, these object identification approaches may involve automatic and/or manual identification of objects, to suit various applications. In certain implementations, the object identification engine 130 is omitted, and one or more other approaches are used to obtain the object identification (e.g., the incoming video data 110 and 112, 114 may already include object identification data).

In connection with the approaches shown in FIG. 1, the number of the temporally-adjacent frames 112 and 114 used in generating motion saliency data 142, and in generating motion history map data 152 can be set based upon the application and, in some instances, a desired application to the video data at hand. For example, a saliency map can be generated and used for a larger number of frames temporally before and/or after a source frame to emphasize shape preservation, while a limited number of frames can be used to generate the motion history map data 152 for weighting the warp as applied to the source video frame 110. These tradeoffs can be programmed into a system executing functions in accordance with FIG. 1, or obtained as a tunable parameter set by a system user or as otherwise automatically determined.

The various engines and related functions as shown in FIG. 1 may be implemented in one or more of a variety of manners. In some embodiments, the engines as shown are software-implemented modules, executable by a computer system for carrying out the respective functions and transforming pixel data for an input video frame into pixel data representing a corresponding warped video frame as an output. In this context, the image itself is transformed, as defined by the transformed pixel data representing the image, and used to display a warped image representing a scene. Other embodiments are directed to software stored on a computer-readable medium, such as a DVD or other recordable medium. Still other embodiments are directed to a programmed logic circuit, such as a processor, computer or discrete logic circuit. Such logic circuits may be implemented as part of a personal computer, hand-held device or a media playback device (e.g., a television or portable device). One or more of these and/or similar embodiments may be implemented in a manner consistent with that shown in and described in connection with FIG. 4 below.

Further regarding FIG. 1, the various engines and flow patterns as shown can be combined and/or processed in different manners, to suit particular applications. For example, the respective functions carried out by one or more of the object identification engine 130, saliency engine 140, motion history map engine 150 and video warping engine 160 may be integrated into a common device. As another example, the video frame 110 as shown provided to the video warping engine 160 can instead be processed via modification at the respective object identification, saliency and motion history stages and presented as such (an output of the motion history map engine 150) to the video warping engine.

In addition, each of the various components and functions shown in FIG. 1 may be executed in software-implemented modules, in a logic circuit, processor or computer. These software-implemented modules may be executed in part or in whole, in a hand-held device such as a mobile telephone device or tablet device. In certain embodiments, aspects of these modules are carried out at a location remote to a display device (e.g., such as a mobile telephone), and can be carried out based upon known screen size constraints at a hand-held device to which video is streamed. For instance, data identifying image-salient or motion-salient portions of an image may be communicated as part of metadata embedded with a video stream, and used at a hand-held device in warping video to suit display size constraints at the hand-held device.

Motion history maps as discussed herein are calculated using one or more approaches, depending upon the implementation. The following discussion begins with the characterization of the calculation and implementation of a motion history map, $M_t^H$ used for saliency map generation, in accordance with a particular example embodiment.

Motion saliency, $S_i^M$, values from multiple neighboring frames are blended using a box filter as $$M_t^H(p) = \sum_{l=t-k}^{t+k} S_l^M(H_{t \to l}(p)), \quad (1)$$

where k is the size of a window in frames and can be set/adjusted based upon a desired tradeoff between temporal coherence and shape preservation as discussed above. In some implementations, a relatively wide window (e.g., k=80) is used to achieve relatively little distortion of the moving object, via the incorporation of a relatively large area into the history map. In other implementations, a relatively narrower window (e.g., k=40-60) is used to enhance temporal coherence. This window size can be set, or tuned, to achieve a desired tradeoff between temporal coherence and shape preservation. Accordingly, the window size is greatly varied in accordance with various embodiments, and may be controlled via user input based upon a viewed resulting video corresponding to the window size. In this context, values of k can range from a few frames to tens or hundreds of frames, depending upon the application.

The homography $H_{t \to l}$ is used between the frame for which the history map is being computed (t) and the frame being summed (l) to correct for camera motion. A motion history map, such as that developed using the position of an object in adjacent frames, is combined with the image saliency map, $S_t^I$, into a saliency map, $S_t$, as follows.

$$S_t = \lambda_I S_i^I + \lambda_m M_t^H \quad (2),$$

Each input video frame is divided into a uniform grid mesh, where $V_{i,j,t}$ is the grid vertex at position (i, j) at input frame t and $V'_{i,j,t}$ is the corresponding output. In certain embodiments, the term t is omitted for simplicity. The mesh is warped such that it has a new target size (e.g., for a particular display) while mitigating or minimizing visual distortion. The new target size is determined by defining a boundary condition of the boundary vertices in the same way as:

$$\begin{cases} y'_{i,j} = 0, & \forall V_{i,j} \in \text{ the top boundary} \\ y'_{i,j} = H', & \forall V_{i,j} \in \text{ the bottom boundary} \\ x'_{i,j} = 0, & \forall V_{i,j} \in \text{ the left boundary} \\ x'_{i,j} = W', & \forall V_{i,j} \in \text{ the right boundary,} \end{cases} \quad (3)$$

where W' and H' are the target width and height, $(x'_{i,j}, y'_{i,j})$ is the target position of vertex $V_{i,j}$.

Using this approach, each mesh patch, F, is encouraged to undergo a similarity transformation to mitigate or minimize visual distortion. A quadratic energy term, such as described in T. Igarashi, T. Moscovich, and J. F. Hughes, "As-rigid-as-possible shape manipulation," *ACM Trans. Graph.*, 24(3): 1134-1141 (2005), is used to measure the violation against the similarity transformation constraint.

FIG. 2 shows an approach for using such a quadratic energy term, in which an input square mesh patch as shown in FIG. 2A and corresponding target vertices as shown in FIG. 2B are used for shape distortion measurement in accordance with another example embodiment. The mesh patch $F\{V_0, V_1, V_2, V_3\}$ is an input square mesh patch. Each of $V'_0$, and $V'_2$ are the corresponding target vertices. Given $V'_1$ and $V'_2$, $V''_0$ is the expected coordinate for $V'_0$ if the patch undergoes a similarity transformation. The violation of the similarity transformation associated with $V_0$ is measured by the distance between $V''_0$ and the actual position $V'_0$.

As shown in FIG. 2, $V_0$ can be defined in the local coordinate system defined by $V_1$ and $V_2$:

$$V_0 = V_1 + R_{90}\overrightarrow{V_1 V_2}, \quad (4)$$

$$R_{90} = \begin{bmatrix} 0 & 1 \\ -1 & 0 \end{bmatrix}.$$

Given $V_1$ and $V_2$, a similarity transformation is applied to this mesh patch to compute an expected coordinate for $V'_0$, denoted by $V''_0$:

$$V_0'' = V_1^l + R_{90}\overrightarrow{V_1^l V_2^l} \quad (5)$$

The expected coordinate for each of the other three vertices is calculated similarly, using the following two vertices in the counter clockwise direction. The violation against the similarity transformation is calculated as the distance between an expected position of each vertex and its actual position as follows:

$$E_F^S = \sum_{V_i \in F} S_F \|V_i'' - V_i'\|_2^2, \quad (6)$$

where $S_F$ is the sum of the importance values inside the mesh patch F.

The orientation and size is generally maintained for important content, such as for tracked objects that move from frame to frame. In this context and as relative to various embodiments, each patch F is encouraged to keep its orientation by encouraging the vertical edges of the patch to remain vertical, and the horizontal edges of the patch to remain horizontal, via manipulation of the corresponding data from frame to frame during the warping process. In some implementations, the size of the patch is maintained (e.g., close to the size of the patch in a previous frame) by encouraging each edge to maintain the original (or previous) length of the edge. Accordingly, the following energy terms $E^L$ and $E^O$ are defined to encourage each patch to keep its size and orientation respectively:

$$E_F^L = S_F(\|x_3'-x_0'-w\|_2^2+\|x_2'-x_1'-w\|_2^2+\|y_1'-y_0'-w\|_2^2+\|y_2'-y_3'-w\|_2^2), \text{ and} \quad (7)$$

$$E_F^O = S_F(\|y_0'-y_3'\|_2^2+\|y_1'-y_2'\|_2^2+\|x_0'-x_1'\|_2^2+\|x_2'-x_3'\|_2^2), \quad (8)$$

where $(x'_?, y'_?)$ is the target position of vertex $V_?$, and w is the length of the patch edge.

To maintain the temporal coherence, each frame is processed to encourage temporal coherence so that the frame undergoes a warp that is similar to and/or the same as the warp applied to a previous frame, or to whatever frame is used as a basis for warping a current frame. The previous warp is effectively modified based upon the movement of the object and related shape preservation, using the motion history map to guide this temporal coherence constraint and effectively constrain the background and moving object(s) differently. Using this approach, the motion history map changes gradually and smoothly over time (from frame to frame), as the maps for each frame are respectively based upon a series of adjacent frames relative to the frame at hand, which facilitates the generation of coherently-warped frames.

In this context and as applicable to various embodiments, a unified temporal constraint is applied to the whole video frame, to encourage the warp of the current frame to be the same as the previous frame, and this constraint is weighted more for the background as relative to the portion of the frame corresponding to the moving object, based upon the motion history map. In many implementations, a small temporal window such as k=5 (e.g., relative to Equation 2) is used for a motion history map with temporal coherence weights as shown in Equation 9 below. Such a small window can be implemented to facilitate desirable temporal coherence for the background by reducing the area of the motion region. For example, by limiting the number of frames used in determining a motion history map, the total movement of a tracked object throughout the series of frames is also limited relative, for example, to a larger number of frames over which the total movement of the object is greater. The weight for each vertex is defined as follows:

$$w_T(V_{i,j,t}) = \min\{1/M_t^H(V_{i,j,t}), 1000\} \quad (9),$$

A homography H is estimated and used to compensate for global camera motion. For each vertex $V_{i,j,t-1}$ in frame t−1, the position $P_{i,j,t}$ of the vertex is calculated in a frame t, using the tomography $H_{(t-1)\to t}$ from frame t−1 to frame t. Since $P_{i,j,t}$ might not be a grid vertex, constraint is not applied to $P_{i,j,t}$ directly; $P_{i,j,t}$ is represented as a bilinear interpolation of the four vertices that enclose it as follows:

$$P_{i,j,t} = \sum_k w_k V_k, \quad (10)$$

where $V_k$ represents the four vertices enclosing $P_{i,j,t}$ at frame t, and $w_k$ represents the corresponding bilinear interpolation coefficients that sum to 1. The term $w_k$ is computed by finding the patch that $P_{i,j,t}$ belongs to and inverting the bilinear interpolation of the patch. For general information regarding such approaches, and for specific information regarding an approach to bilinear interpolation that may be suitable for implementation in accordance with various example embodiments, reference may be made to P. S. Heckbert, "Fundamentals of texture mapping and image warping," Technical Report UCB/CSD-89-516, EECS Department, University of California, Berkeley, (June 1989), which is fully incorporated herein by reference.

To maintain the temporal coherence, the output position $P'_{i,j,t}$ of $V'_{i,j,t-1}$ at frame t is constrained to be the same as the actual position of $V'_{i,j,t-1}$ (e.g., as calculated by the bilinear interpolation of $V_k$ of the output patch at frame t as follows:

$$E^T_{V_{i,j,t}} = \omega_T(V_{i,j,t}) \left\| \sum_k w_k V'_k - (T^{-1} H_{t-1 \mapsto t} T) V'_{i,j,t-1} \right\|^2_2 \quad (11)$$

$$T = \begin{bmatrix} W/W' & 0 & 0 \\ 0 & H/H' & 0 \\ 0 & 0 & 1 \end{bmatrix},$$

where W and H are the input width and height, W' and H' are the output width and height, and matrix T is a scaling transformation configured to account for the frame size change of the video, from the target frame to input frame). In many implementations, the warp applied to the moving object is done without a special set of coherence-based constraints.

The energy terms as relative to the above are combined, as represented in the following quadratic energy minimization problem:

$$E = \sum_{F \in F} (\lambda_S E^S_F + \lambda_O E^O_F + \lambda_L E^L_F) + \sum_{V \in V} \lambda_T E^T_V \quad (12)$$

where V is a vertex belonging to the vertex set V and F is a mesh patch belonging to the mesh patch set F. This energy minimization problem can be solved, for example, using the sparse linear solver in Intel Math Kernel Library available from Intel Corporation, Santa Clara, Calif.

A variety of different types of videos can be warped using approaches as discussed herein. For example, cartoons, feature movies and home videos including a variety of camera motions, such as static, pan, zoom and casual movement can be appropriately warped. In some implementations involving relatively long videos, a shot boundary detection algorithm is used to segment the video into shots, and each shot is warped independently. This segmentation may involve, for example, breaking the video into sets of frames as described above, or combinations of sets of frames in which each frame is warped using adjacent frames in the set to which the frame belongs. In addition, such sets may overlap one another, such that frames near the beginning or end of a set also belong to another set in which the frames have additional adjacent frames temporally before and/or after the frame.

Figure 3:
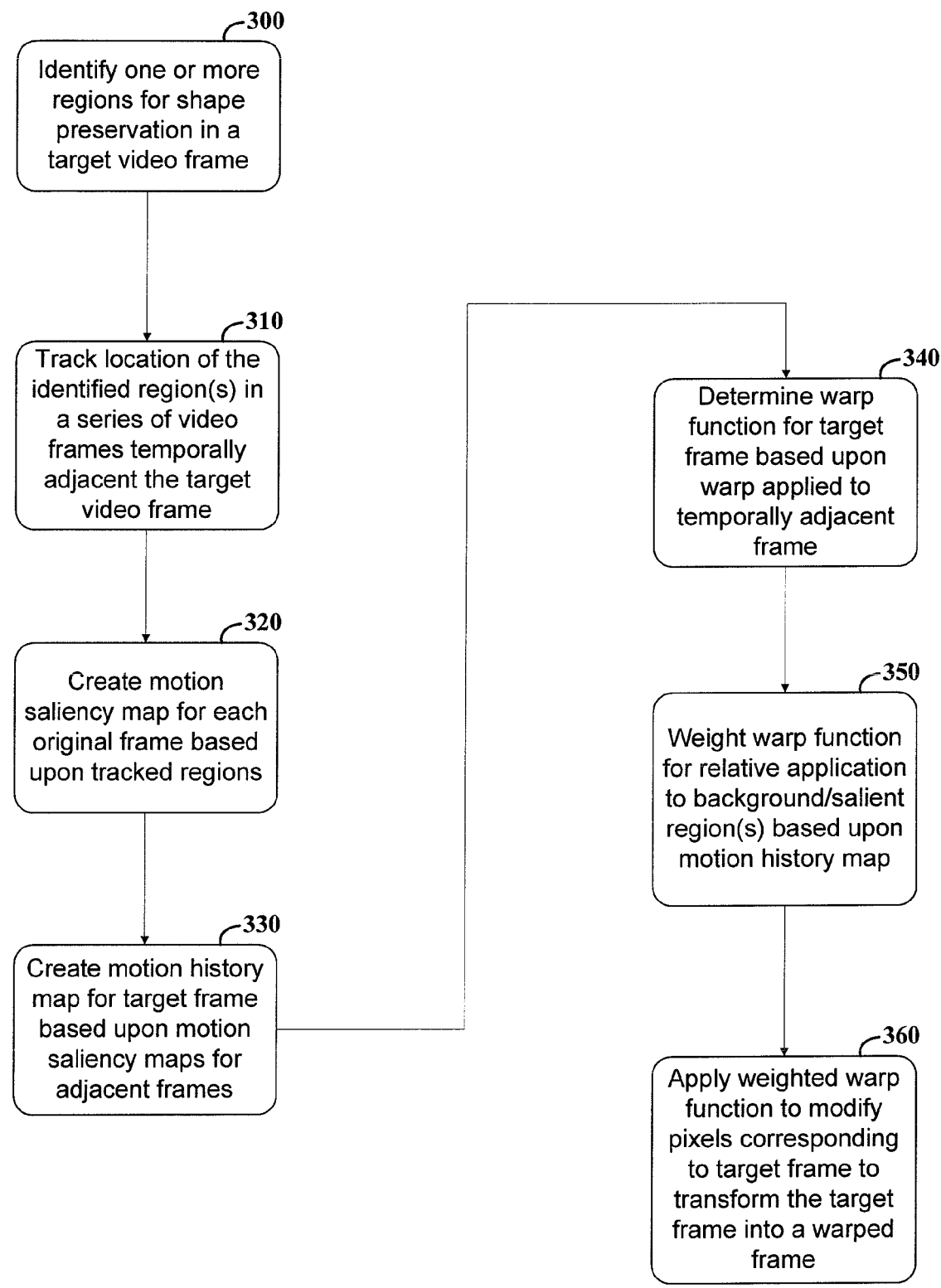
FIG. 3 shows a flow diagram for warping video, in accordance with an example embodiment of the present invention.

FIG. 3 shows a flow diagram for warping a series of video frames as may be applicable to one or more of the above-discussed types of videos, according to another example embodiment. At block 300, one or more regions are identified from a source video frame to be warped for frame-to-frame shape preservation. This region or regions are those for which the shape thereof is desirably preserved, and identification thereof may involve one or more of a variety of approaches.

At block 310, the location of an identified region or regions is tracked for a series of video frames temporally adjacent the source video frame. A motion saliency map is created at block 320 for each frame, based upon the position of the tracked region(s) in the frame (and, e.g., image-salient regions). At block 330, a motion history map is created for the source frame, based upon motion salient regions for one or more of the temporally adjacent video frames. This motion history map provides an indication of frame-to-frame motion in the source video frame.

Once the motion history map has been generated, a warp function for the source frame is generated at block 340, based upon a warp function as applied to a temporally adjacent frame. Generally, this warp function may be drawn from the warp as applied to an immediately temporally previous frame in the series of video frames.

At block 350, the warp function is weighted for relative application to background and salient portions of the video frame, based upon the motion history map, to appropriately weight the application of the warp function thereto. The weighted warp is then applied to the source video frame at block 360, to generate an output video frame that is warped similarly to previous frames, but weighted to generally preserve the shape of salient regions identified and tracked at blocks 300 and 310. This output video frame is modified by modifying pixel data corresponding to the video frame, to effectively transform the source frame into a warped frame. The steps carried out in blocks 300-360 can be repeated on a frame-by-frame basis, using saliency information from adjacent frames to develop frame-specific motion history maps, and accordingly warp each frame. This approach is particularly amenable to implementation, for example, with streaming video, and can be effected upon a subset (e.g., 1-2 seconds) of a much larger video (e.g., several minutes or hours, or a live broadcast).

Figure 4:
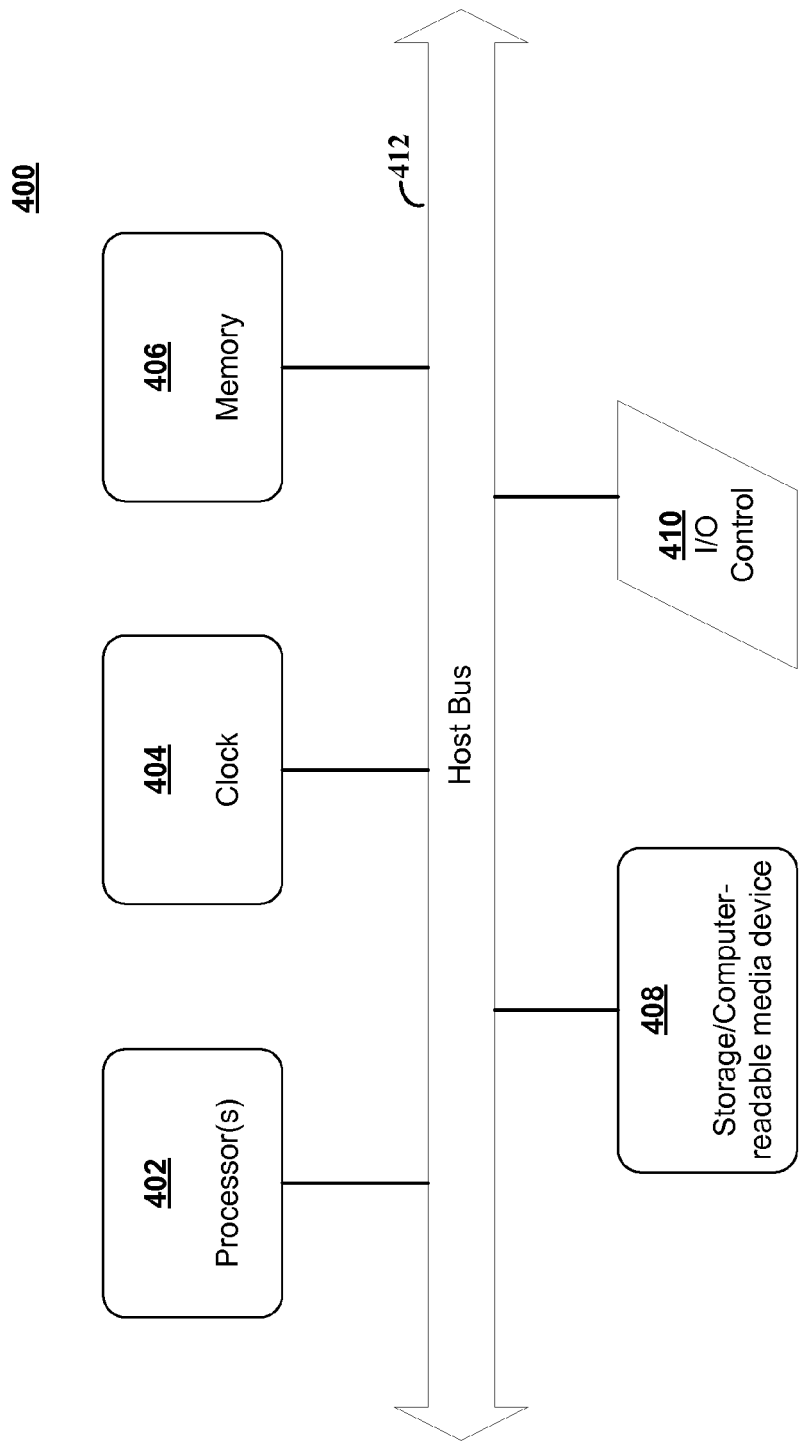
FIG. 4 shows a block diagram of an example computing arrangement and processor-readable storage medium; in accordance with one or more example embodiments of the present invention.

FIG. 4 shows a block diagram of an example computing arrangement that may be configured to implement the processes and functions described herein, and further showing a processor-readable storage medium that may be configured to store instructions to carry out the corresponding processes and functions. Various alternative computing arrangements, including one or more processors and a memory arrangement configured with program code, may be implemented for hosting the processes and data structures and implementing the algorithms of the different embodiments. Computer code, including the processes of one or more embodiments encoded in a processor executable format, may be stored and provided via a variety of computer-readable storage media or delivery channels such as magnetic or optical disks or tapes, electronic storage devices, or as application services over a network.

Processor computing arrangement 400 includes one or more processors 402, a clock signal generator 404, a memory unit 406, a storage unit 408, and an input/output control unit 410 coupled to a host bus 412. The arrangement 400 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements. The processor 402 may include one or more general purpose processors, or a combination of one or more general purpose processors and suitable co-processors, or one or more specialized processors (e.g., RISC, CISC, pipelined, etc.).

The memory arrangement 406 may include multiple levels of cache memory, and a main memory. The storage arrangement 408 may include local and/or remote persistent storage such as provided by magnetic disks, flash, EPROM, or other non-volatile data storage. The storage unit may be read or read/write capable. Further, the memory 406 and storage 408 may be combined in a single arrangement.

The processor arrangement 402 executes the software in storage 408 and/or memory 406 arrangements, reads data from and stores data to the storage 408 and/or memory 406 arrangements, and communicates with external devices (e.g., a video data communications circuit and/or a video display) through the input/output control arrangement 410. These functions are synchronized by the clock signal generator 404. The resource of the computing arrangement may be managed by either an operating system, or a hardware control unit.

Modifications and/or additions to the warping approaches as described herein are carried out in a variety of manners, due to characteristics of the video and/or processing resources. For example, video sections in which object motion is significant or dominates can be treated differently, relative to other video potions. In some applications involving significant object movement, a nearly uniform motion history map is generated over an entire frame, which leads to an almost uniform stretching result. In other examples, a global 2D motion model such as homography is used in warping frames as discussed herein, but is augmented to account for parallax in the video.

In certain implementations benefitting from additional processing, such as those involving video frames having significant object motion, a 2D motion model is modified, augmented and/or disregarded in favor of an alternative model for one or more of the video frames. For instance, user input constraints can be applied to certain portions of a video known to exhibit a great deal of object motion. In one embodiment, a 2D motion model such as described herein is applied to portions of a video amenable to such an approach, and more complex models are applied to video portions in which object motion is significant or dominant. Accordingly, computational savings are achieved for those portions of a video amenable to the 2D approach (e.g., which often constitutes the vast majority of a video or video stream), and the use of more computationally-intense approaches is limited to those video portions in which object motion is significant or dominant.

Other embodiments involve augmenting a warping approach as described herein, to address other issues with certain types of video. For example, video susceptible to re-sampling artefacts, such as blurring resulting from significant changes in aspect ratio (e.g., from 4:3 to 7:3), are addressed using additional processing. One such approach involves using a 2D version of an EWA (elliptical weighted average) splatting method such as described in Krähenbühl et al., referenced above. Another such approach involves the use of super resolution methods to enhance the resizing results, such as described in R. Fattal, "Image upsampling via imposed edge statistics," *ACM Trans. Graph.*, 26(3):95 (2007), which is fully incorporated herein by reference.

In some embodiments, certain object detection approaches are further implemented to better identify one or more different objects, to suit particular applications. For example, certain types of video may include an object that is difficult to track or exhibits significant motion, or may include two or more objects that move differently relative to one another. In such approaches, object identification and tracking modules can be executed along with other processing to better identify and track the object or objects.

The warping of video frames as discussed herein is carried out to suit the particular application, with characteristics such as a number and orientation of pixels selected accordingly. In one embodiment, each video frame is divided into a uniform grid mesh, such as a 10×10 block of pixels. The video is pre-processed for motion estimation and saliency computation. As a particular example, using a machine with a 3.16 GHz Intel Dual Core CPU and 3 GB of memory, 55 fps (frames per second) is achieved for a mesh size of 32×24 pixels, 60 fps is achieved for a mesh size of 42×18 pixels, and 100 fps is achieved for a mesh size of 32×18 pixels. After obtaining warping results, a texture mapping approach can be used to render the final results.

Various embodiments described above and shown in the figures may be implemented together and/or in other manners. One or more of the items depicted in the drawings/figures herein can also be implemented in a more separated or integrated manner, or removed and/or rendered as inoperable in certain cases, as is useful in accordance with particular applications. For example, a variety of different types of video can be warped, using warping functions and related parameters such as described herein, alone or in connection with other warping functions or other video processing functions such as those related to object detection, artefact suppression or others. In addition, warps may be applied differently to different portions of a video frame, set of video frames or entire videos, to suit particular applications. Moreover, many embodiments are directed to setting, or tuning, warping functions relative to an end quality as may be amenable, for example, to available processor capabilities, available bandwidth and intended use of the resulting (transformed) video images. In view of this and the description herein, those skilled in the art will recognize that many changes may be made thereto without departing from the spirit and scope of the present invention.

What is claimed is:

1. A method for processing video data, the method comprising, for each of a plurality of source video frames:
    using pixels representing the source video frame and at least one temporally-adjacent video frame, generating a motion history map based upon frame-to-frame movement of at least one region in the source video frame and temporally-adjacent video frames;
    identifying at least one salient region in the source video frame based upon the motion history map and static image saliency data;
    determining weighting data for warping pixels corresponding to background regions of the source video frame differently than pixels corresponding to the at least one salient region in the source video frame; and
    using the weighting data, warping the pixels representing the source video frame to generate pixels representing a warped video frame.

2. The method of claim 1, wherein identifying at least one salient region in the source video frame based upon the motion history map and static image saliency data includes
    identifying at least one image-salient region in the source video frame based upon static image saliency data that identifies at least one salient region in the source video frame, and
    identifying salient regions including the identified at least one image-salient region and at least one region exhibiting frame-to-frame movement in the motion history map.

3. The method of claim 1, wherein identifying at least one salient region in the source video frame based upon the motion history map and static image saliency data includes
    in response to the static image saliency identifying no image-salient regions, identifying the at least one salient region based upon at least one region exhibiting frame-to-frame movement in the motion history map.

4. The method of claim 1, wherein warping the pixels representing the source video frame to generate pixels representing a warped video frame includes
    determining a current warp function by generating a modified warp function based upon a previous warp function applied to a video frame in the video data that temporally precedes the source video frame, using the weighting data to constrain modifications to the warp function to be applied to pixels corresponding to the background region, relative to the warp function to be applied to pixels corresponding to the salient regions, and applying the current warp function to the source video frame to warp the pixels representing the source video frame to resize at least the background region.

5. The method of claim 4, wherein determining a current warp function by generating a modified warp function based upon a previous warp function includes modifying the previous warp function.

6. The method of claim 4, wherein determining a current warp function by generating a modified warp function based upon a previous warp function includes determining a current warp function for warping the warped video frame, and modifying the current warp function based upon the previous warp function.

7. The method of claim 4, wherein using the weighting data to constrain modifications to the warp function to be applied to pixels corresponding to the background region, relative to the warp function to be applied to pixels corresponding to the salient regions, includes constraining modifications to the warp function to be applied to the salient region pixels to preserve both the shape of the salient region pixels and the continuity of the warp function as applied to the salient region pixels in at least one adjacent frame.

8. The method of claim 4, wherein applying the current warp function includes resizing the salient regions.

9. The method of claim 1, wherein generating a motion history map based upon frame-to-frame movement of at least one region in the source in temporally-adjacent video frames includes identifying an area in the source video frame, that spatially covers areas in which the at least one region is located in the temporally-adjacent video frames.

10. The method of claim 1,
further including generating an image saliency map for the source video frame based upon static image-saliency data for a plurality of video frames temporally adjacent the source video frame,
wherein identifying at least one salient region in the source video frame based upon the motion history map and static image saliency data includes identifying at least one salient region based on the image saliency map.

11. The method of claim 1, wherein generating a motion history map based upon frame-to-frame movement of at least one region in the source in temporally-adjacent video frames includes blending motion saliency data for each of the source video frame and plurality of temporally-adjacent video frames.

12. The method of claim 1,
further including setting a number of temporally-adjacent video frames for use in generating the motion history map based upon a tradeoff condition between temporal coherence and shape preservation for salient regions in the source video frames, and
wherein generating the motion history map based upon frame-to-frame movement of at least one region in the source video frame and temporally-adjacent video frames includes generating the motion history map based upon frame-to-frame movement of the at least one region in the set number of temporally-adjacent video frames.

13. A method for processing a stream of video data, the method comprising:

in response to a user input setting a tradeoff condition between temporal coherence and shape preservation, setting a weighting parameter for applying a warp to each of a plurality of video frames in the stream of video data;

for each of the video frames, determining at least one region of the frame as a salient region based upon
frame-to-frame movement of an object in a set number of video frames that are temporally adjacent the video frame, and
image saliency data that identifies image-salient regions in the video frame; and
using the set weighting parameter, weighting, for each of the plurality of video frames, background regions of the image differently from the at least one region of the frame determined as salient.

14. The method of claim 13, further including, for each of the plurality of video frames, resizing the video frame using the weighting for the frame to resize the background regions differently from the at least one salient region determined for the frame.

15. The method of claim 13, wherein setting a weighting parameter includes setting a number of temporally-adjacent video frames to use in determining frame-to-frame movement of at least one region in the temporally-adjacent video frames.

16. An article of manufacture, comprising:
a non-transitory processor-readable storage medium configured with configuration data that when executed by a processor, cause the processor to, for each of a plurality of source video frames:
generate a motion history map based upon frame-to-frame movement of at least one region in the source video frame and temporally-adjacent video frames using pixels representing the source video frame and at least one temporally-adjacent video frame,
identify at least one salient region in the source video frame based upon the motion history map and static image saliency data,
determine weighting data for warping pixels corresponding to background regions of the source video frame differently than pixels corresponding to the at least one salient region in the source video frame, and
using the weighting data, warp the pixels representing the source video frame to generate pixels representing a warped video frame.

17. The article of manufacture of claim 16, wherein the processor-readable storage medium is further configured with configuration data that when executed by a processor, cause the processor to, for each of a plurality of source video frames, identify at least one salient region in the source video frame based upon the motion history map and static image saliency data by
identifying at least one image-salient region in the source video frame based upon static image saliency data that identifies at least one salient region in the source video frame, and
identifying salient regions including the identified at least one image-salient region and at least one region exhibiting frame-to-frame movement in the motion history map.

18. The article of manufacture of claim 16, wherein the processor-readable storage medium is further configured with configuration data that when executed by a processor, cause the processor to, for each of a plurality of source video frames, identify at least one salient region in the source video frame based upon the motion history map and static image saliency data by, in response to the static image saliency identifying no image-salient regions, identifying the at least one salient region based upon at least one region exhibiting frame-to-frame movement in the motion history map.

19. The article of manufacture of claim 16, wherein the processor-readable storage medium is further configured with configuration data that when executed by a processor, cause the processor to, for each of a plurality of source video frames, warp the pixels representing the source video frame to generate pixels representing a warped video frame by
  determining a current warp function by generating a modified warp function based upon a previous warp function applied to a video frame that temporally precedes the source video frame, using the weighting data to constrain modifications to the warp function to be applied to pixels corresponding to the background region, relative to the warp function to be applied to pixels corresponding to the salient regions, and
  applying the current warp function to the source video frame to warp the pixels representing the source video frame.

20. The article of manufacture of claim 19, wherein determining a current warp function by generating a modified warp function based upon a previous warp function includes modifying the previous warp function.

21. The article of manufacture of claim 19, wherein determining a current warp function by generating a modified warp function based upon a previous warp function includes determining a current warp function for warping the warped video frame, and modifying the current warp function based upon the previous warp function.

22. The article of manufacture of claim 16, wherein the processor-readable storage medium is further configured with configuration data that when executed by a processor, cause the processor to, for each of a plurality of source video frames,
  generate an image saliency map for the source video frame based upon static image-saliency data for a plurality of video frames temporally adjacent the source video frame, and
  identify at least one salient region in the source video frame based upon the motion history map and static image saliency data, by identifying at least one salient region based on the image saliency map.

23. The article of manufacture of claim 16, wherein the processor-readable storage medium is further configured with configuration data that when executed by a processor, cause the processor to, for each of a plurality of source video frames,
  set a number of temporally-adjacent video frames for use in generating the motion history map based upon a tradeoff condition between temporal coherence and shape preservation for salient regions in the source video frames, and
  generate the motion history map based upon frame-to-frame movement of the at least one region in the set number of temporally-adjacent video frames.

24. An apparatus for processing video data, the apparatus comprising:
  a logic circuit configured to, for each of a plurality of source video frames
    generate a motion history map based upon frame-to-frame movement of at least one region in the source video frame and temporally-adjacent video frames using pixels representing the source video frame and at least one temporally-adjacent video frame,
    identify at least one salient region in the source video frame based upon the motion history map and static image saliency data,
    determine weighting data for warping pixels corresponding to background regions of the source video frame differently than pixels corresponding to the at least one salient region in the source video frame, and
    using the weighting data, warp the pixels representing the source video frame to generate pixels representing a warped video frame.

25. The apparatus of claim 24, wherein the logic circuit is configured to
  determine the weighting data by, in response to a user input setting a tradeoff condition between temporal coherence and shape preservation, setting a weighting parameter for applying a warp to each of a plurality of video frames in the video data, and
  warp the pixels by using the weighting parameter to warp the pixels representing the source video frame to generate the pixels representing the warped video frame.

* * * * *